United States Patent [19]

Phelan et al.

[11] Patent Number: 4,728,954
[45] Date of Patent: Mar. 1, 1988

[54] GROUND VELOCITY SENSOR WITH DROP-OUT DETECTION

[75] Inventors: James J. Phelan, Bettendorf, Iowa; Garn F. Penfold, East Moline, Ill.; Larry W. Ferguson, Bettendorf, Iowa

[73] Assignee: Deere & Company, Moline, Ill.

[21] Appl. No.: 684,217

[22] Filed: Dec. 20, 1984

[51] Int. Cl.⁴ ............................................. G01S 13/60
[52] U.S. Cl. ..................................... 342/115; 342/92; 342/195; 367/91
[58] Field of Search ................. 343/8; 367/91, 97; 342/70-72, 104, 114-117, 195, 89, 91, 92, 103

[56] References Cited

U.S. PATENT DOCUMENTS

| | | | |
|---|---|---|---|
| 3,618,084 | 11/1971 | Balsiger et al. | 342/104 X |
| 4,172,256 | 10/1979 | Pacozzi | 343/8 |
| 4,181,432 | 1/1980 | Flower | 343/8 X |
| 4,316,173 | 2/1982 | Matsumura et al. | 342/104 |
| 4,320,398 | 3/1982 | Fritzlen | 342/104 X |
| 4,389,648 | 6/1983 | Luscombe et al. | 342/104 |
| 4,489,321 | 12/1984 | Hoffa et al. | 343/8 |
| 4,527,160 | 7/1985 | Endo et al. | 342/115 |
| 4,568,939 | 2/1986 | Grau | 342/104 |
| 4,635,059 | 1/1987 | Ball | 342/117 |

FOREIGN PATENT DOCUMENTS

| | | | |
|---|---|---|---|
| 3237282 | 5/1983 | Fed. Rep. of Germany | 343/8 |
| 0163579 | 9/1984 | Japan | 343/8 |

*Primary Examiner*—T. H. Tubbesing
*Assistant Examiner*—Bernarr Earl Gregory

[57] ABSTRACT

A vehicle-mounted ultrasonic velocity sensor includes an ultrasonic transmitter and receiver coupled to transmit and receive horns. In one embodiment, a phase-locked-loop signal processing circuit converts the transmitted and reflected frequencies into a signal indicative of the vehicle velocity. In another embodiment, velocity data is obtained by measuring the period of a certain number of cycles of the reflected signal using a pair of counters, one counting at a rate equal to the reflected frequency, the other counting at a fixed rate. In both embodiments, the variable magnitude reflected signal is applied to an input of a drop-out detection circuit whose output is then connected to an input or inputs of the velocity determining circuits to prevent velocity detection during dropout periods.

The velocity sensor may be implemented utilizing radar components.

26 Claims, 15 Drawing Figures

GROUND VELOCITY SENSOR WITH DROP-OUT DETECTION

BACKGROUND OF THE INVENTION

This invention relates to a sensor for sensing the relative velocity between one object moving relative to another, such as the ground velocity of a vehicle, such as an agricultural vehicle.

On most agricultural and off-highway equipment in use today, vehicle speed or velocity is sensed by a magnetic pickup which senses the wheel speed. However, there are problems with this measurement technique. For example, the rear or driving wheels can slip relative to the ground, therefore producing erroneous ground speed readings. When sensing ground speed from the front wheels, the front wheels may be off the ground at times, thus not rotating at true ground speed. As a result of steerage, the front wheels may not track ground speed because of wheel skidding.

Because of the inaccuracies introduced by this type of ground speed measurement, it cannot be effectively used as an input parameter for closed loop control systems such as spraying, planting, and other implement or vehicle controls. To solve these problems, Doppler-type ground speed sensing systems have been proposed. The velocity, Vg, can be determined from the frequency shift between the received and transmitted signals, $\Delta f$, by a modified Doppler equation:

$$Vg = (c\Delta f) \div (ft\ 2 \cos \alpha) \quad (1)$$

where $\alpha$ is the angle of the signal transmission axis from horizontal, where c is the speed of sound, and where ft is the transmitted signal frequency.

A proposed Doppler-type ultrasonic ground velocity sensing system is described in U.S. patent application, Ser. No. 609,626 filed 14 May 1984, now abandoned, and assigned to the assignee of the present application. This and other speed sensing systems utilize phase-locked-loops (PLL) in the signal processing circuitry. In such systems, the magnitude of the received signal can fluctuate considerably in amplitude due to variations in the reflectivity of the ground and due to momentary destructive interference among wave fronts from the various reflecting areas of the ground. Large fluctuations in the receive signal magnitude can cause periods of "drop-out" during which the received frequency is not detectable because the received signal magnitude is too low. These periods of signal drop-out can cause such systems to produce an erroneous or biased velocity output signal. To be more specific, the low magnitude receive signal can cause the PLL to drop out of its locked state, with the result that the output voltage from the PLL goes to zero. Thus, in operation, the PLL output signal will fluctuate between zero and a correct indication of ground speed. When this output signal is averaged or filtered, the result will be an erroneously low indication of ground speed.

U.S. Pat. No. 3,893,076, issued July 1, 1975 to Clifford, teaches a digital speed sensing system wherein counters 114 and 116 contain numbers which represent the time intervals corresponding to successive groups of 5 cycles of a mixed Doppler frequency. These numbers are indicative of the sensed speed. Signal drop-out compensation is provided by a subtractor, comparator and logic circuit coupled between the counters and the system output. If the difference between the numbers in the two counters is large enough, such as when signal drop-out occurs, then the subtractor and comparator operate via logic gates to prevent updating of a register into which one of the numbers is otherwise placed. Such a system has a drawback in that, because the drop-out detection circuit is "downstream" of the counters, it is possible that two consecutive intervals could be the same, even though both intervals contain signal drop-outs. If this occurs, then the register would be updated with a misleading number which would not truly represent the actual speed. Furthermore, such a system is complex and would be expensive to produce.

SUMMARY OF THE INVENTION

An object of the present invention is to provide a speed sensing system with a simple and reliable system for compensating for fluctuations in the amplitude of the reflected or received signal.

Another object of the present invention is to provide a Doppler-type speed sensing system which is insensitive to transmit frequency and component drift.

Another object of the present invention is to provide a Doppler-type speed sensing system with a signal drop-out detecting capability which does not have timing problems.

These and other objects are achieved by the present invention which includes an ultrasonic transmitter and receiver and a signal processing circuit. The signal processing circuit includes a pair of phase-locked-loop (PLL) circuits, the first receiving the transmit frequency, the second receiving the reflected frequency. A drop-out detect circuit has a comparator which receives the reflected signal and compares its rectified and averaged amplitude to a threshold. When this rectified and averaged amplitude drops out or falls below the threshold, the comparator turns on and it opens a switch in the second PLL so that the output of the second PLL remains substantially unchanged for the duration of the drop-out condition. An output signal which represents the ground velocity (speed and direction) is derived from the difference between the outputs of the first and second PLLs. The result is that the output signal is substantially unaffected by the reflected signal drop-out condition.

These and other objects are also achieved by a preferred embodiment of the present invention which includes a master clock from which all timing is derived, a transmit amplifier and transducer, a receive amplifier and transducer, a digital frequency detector and a signal dropout sense and hold circuit.

The master clock is divided down to the transmit frequency (40 kHz is preferred) to drive the transmit amplifier and transducer. The received echo is amplified, squared, and sent to the frequency detector, where the difference between its period and that of the transmit signal is measured. This difference is proportional to speed.

The frequency detector contains two down counters. One is driven by the receive signal, the other is driven by a signal whose frequency is derived from the master clock. The receive counter initializes and turns on and off the clock counter.

During each measurement interval, the clock counter measures the number of clock cycles that occur during a particular number (1280) of receive cycles. Since the transmit frequency is also derived from the master clock, each count of the clock counter represents a fixed fraction of a transmit cycle. Therefore, the final count represents the difference between the transmit and receive periods *in terms of the transmit period,* not in terms of an independent reference. This makes the detector output insensitive to drifts in the master clock frequency or to changes in the characteristics of circuit components.

At the end of each measurement interval, the final count is latched for output and the counting process begins again.

The drop-out detector monitors the amplitude of the receive signal. Thus, in both embodiments, the variable amplitude reflected signal is received by an input of a drop-out detection circuit. Drop-out is considered to occur when this amplitude drops below the minimum level for which true Doppler shift can reliably be detected. When the drop-out condition occurs in the preferred embodiment, the clock and receive counters are inhibited and the frequency detector waits until the drop-out condition ceases. At this time, counting resumes.

DETAILED DESCRIPTION

Figure 1:
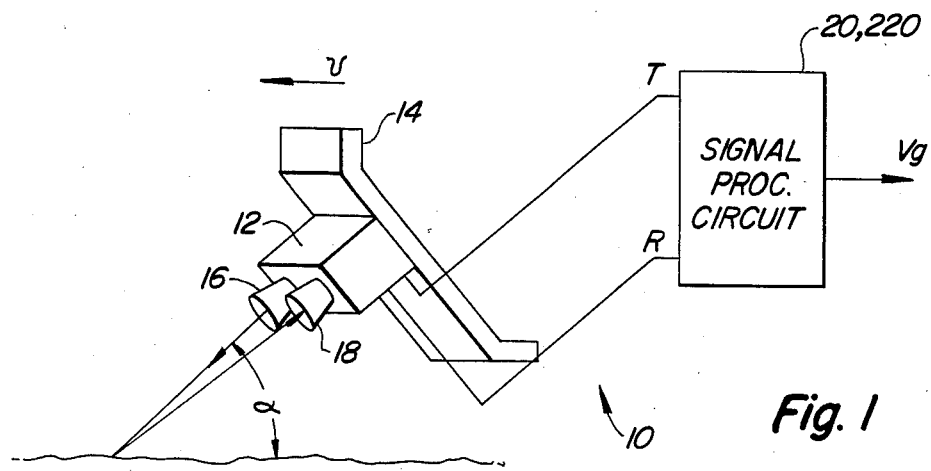
FIG. 1 is a simplified schematic of a speed sensing system.
Figure 3:
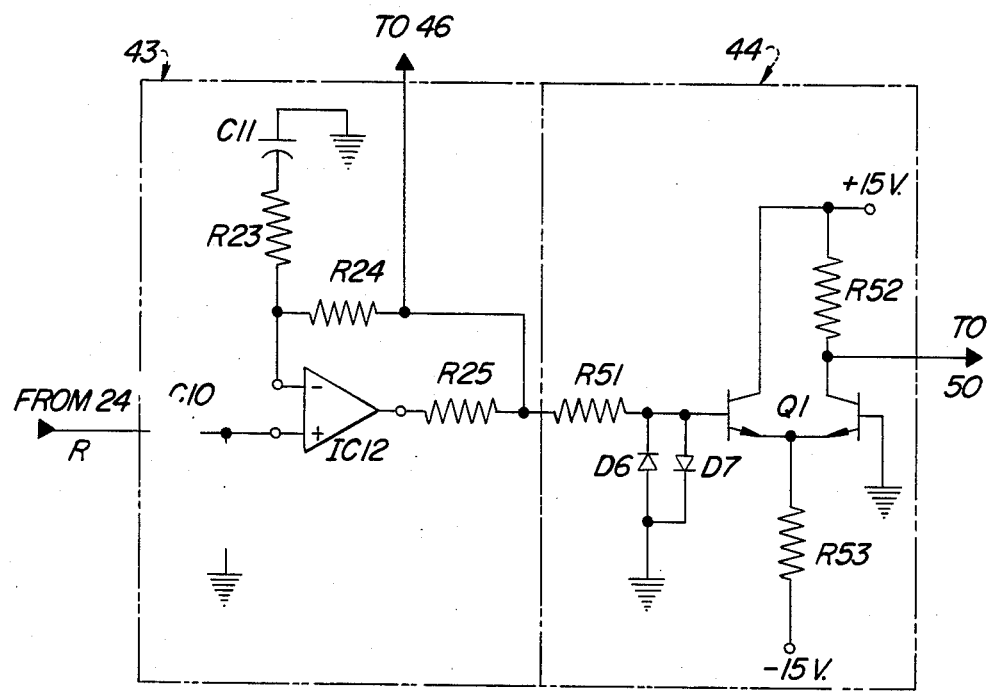
FIGS. 3–7 are detailed circuit diagrams of various portions of FIG. 2.

The ground speed sensing system 10 includes a continuous ultrasonic transmitter and receiver unit 12 for mounting on a vehicle lower frame member 14. The unit 12 has transmit and receive horns 16 and 18, preferably aimed in a forward direction at an angle $\alpha$ of approximately 37 degrees from horizontal. A signal processing unit 20 provides an ultrasonic transmit signal T to the unit 14 and receives a signal from the unit 14. The horns could be conventional ultrasonic horns, but preferably would be similar to the horn assembly described in U.S. patent application, Ser. No. 660,819, filed 15 Oct. 1984, now abandoned, and assigned to the assignee of the present case. The horns 16 and 18 are coupled to a corresponding conventional ultrasonic transmitter 22 and receiver 24. The transmitter 22 preferably transmits continuously at a transmit frequency ft of 40 kHz.

The output of the receiver 24 will be a reflected signal R with frequency fr. Cross talk between the transmitter and receiver is preferably eliminated by using cork to accoustically isolate the horns 16 and 18 from each other or by suspending the horns via known rubber "shock mounts" by placing a sonic baffle or partition between the horns and by using cork to accoustically enclose portions of the horns from which ultrasonic energy could otherwise escape.

If the horns 16 and 18 are aimed towards the ground in the forward direction with respect to vehicle motion, then the reflected signal, R, will have a reflected frequency, fr, which will be higher than ft if the vehicle and system 10 are moving forward. Conversely, fr will be lower than ft if the vehicle and system 10 are moving in reverse.

Figure 2:
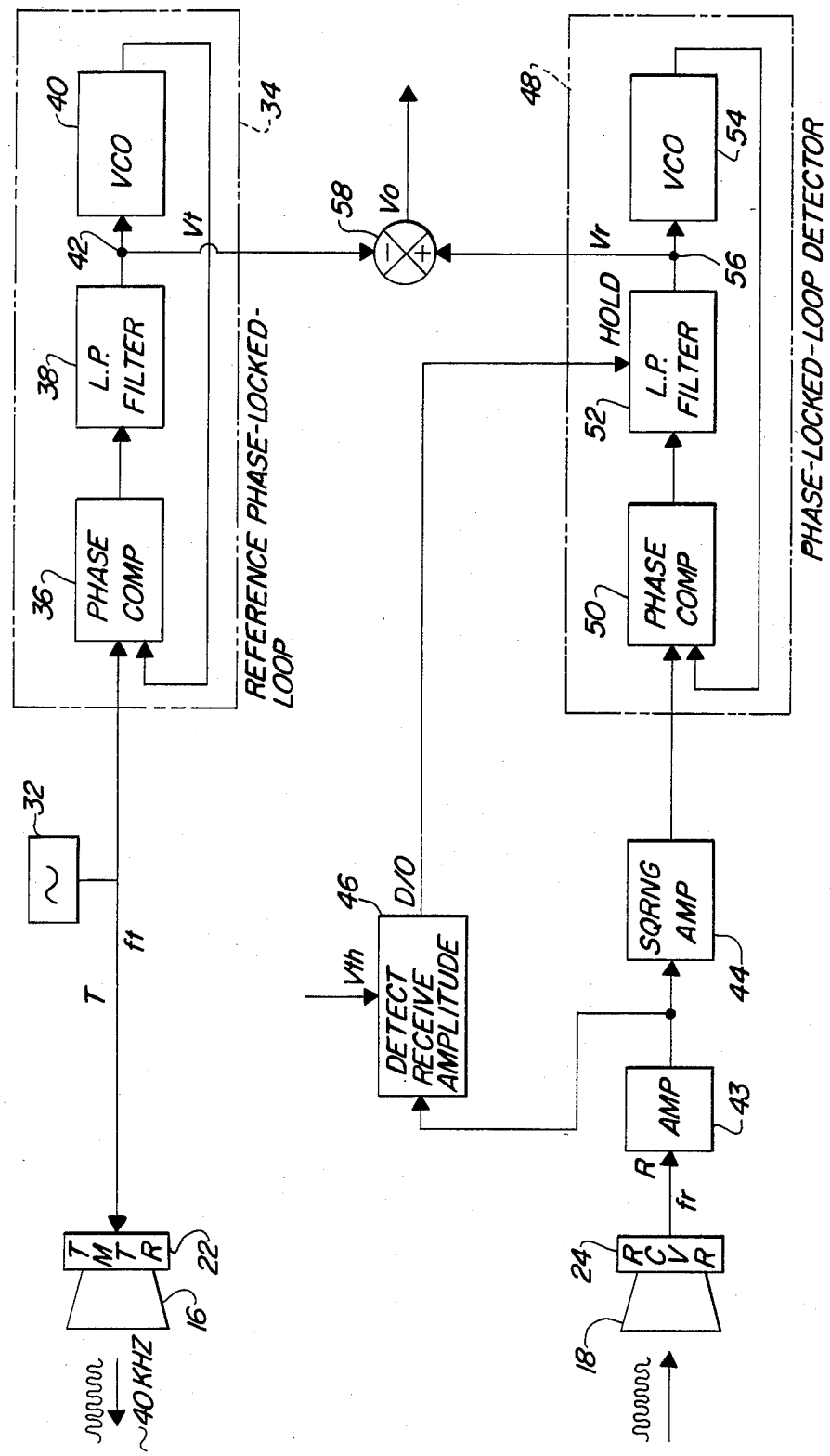
FIG. 2 is a schematic block diagram of one embodiment of the signal processing circuit of FIG. 1.
Figure 4:
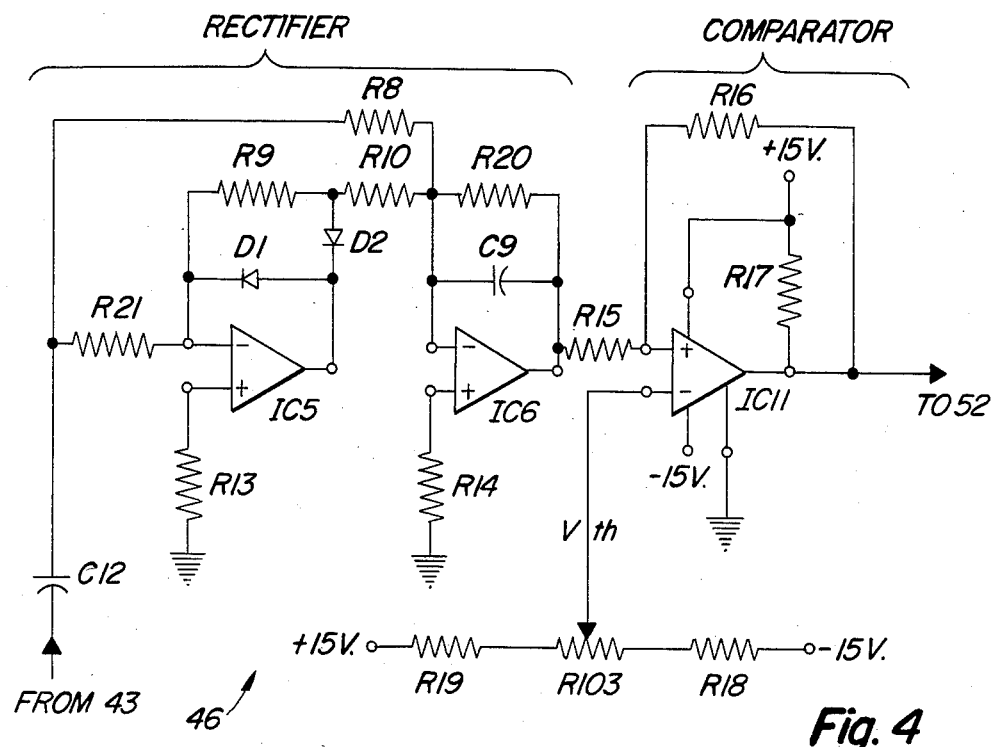
Figure 5:
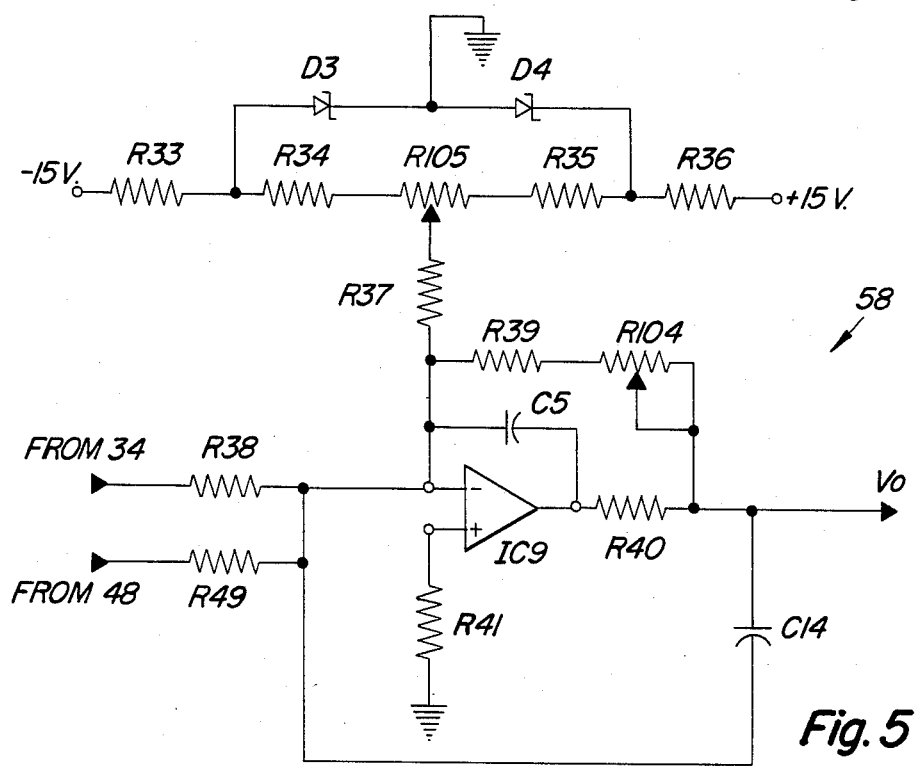
Figure 6:
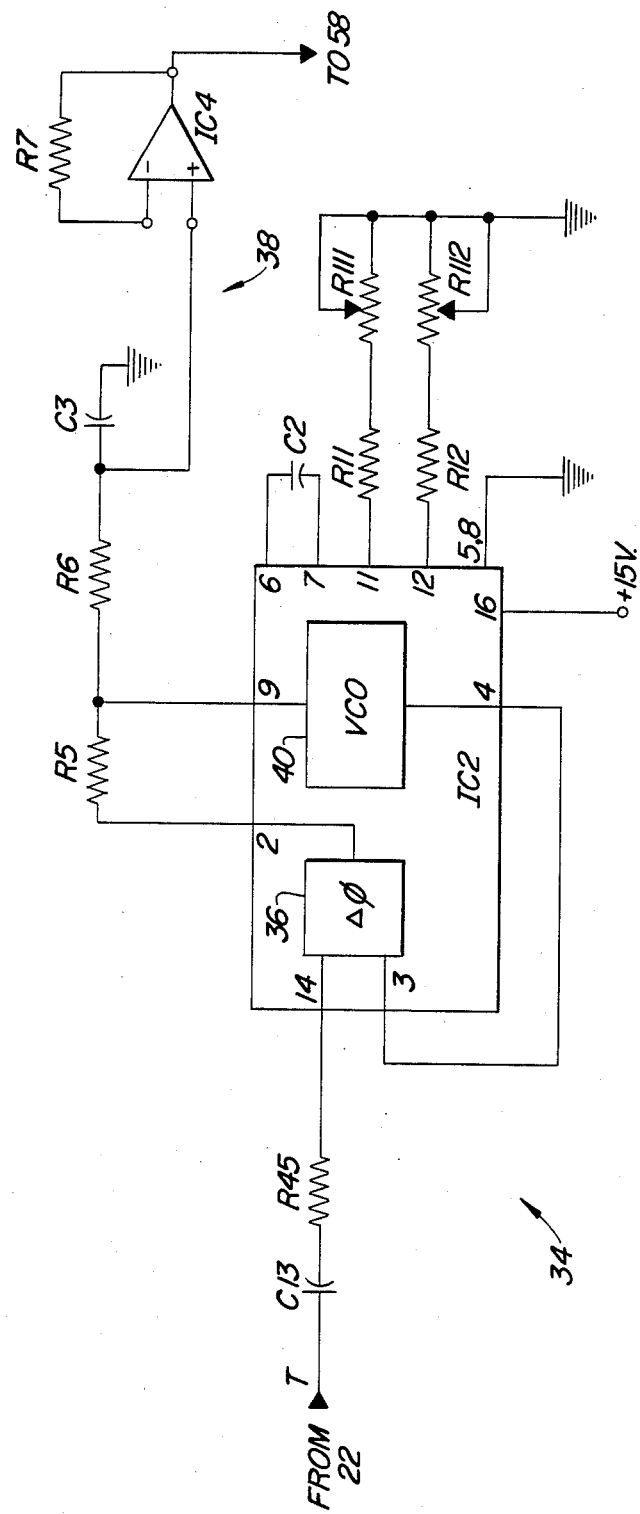

As best seen in FIG. 2, the signal processing circuit 20 includes an oscillator 32 which provides the 40 kHz frequency. Circuit 20 also receives the output R of the receiver 24. The transmit signal T is sent to the transmitter 22 and to a reference phase-locked-loop (PLL) circuit 34. The reference PLL 34 includes a phase comparator 36, a low pass filter 38 and a voltage controlled oscillator 40, connected as shown. The reference PLL 40 provides a reference voltage, Vt, at 42 which is proportional to the transmit frequency ft, less 40,000 Hz.

The output (R) of receiver 24 is received by an input amplifier 43. The output of input amplifier 43 is coupled to a squaring amplifier 44 and by an amplitude comparator or "drop-out" detector circuit 46. The circuit 46 rectifies the R signal and compares the average amplitude of the rectified R signal to a threshold voltage Vth, such as 2 volts, for example, which is slightly above the amplitude at which the PLL drops out of lock. The output of circuit 46 is normally low, but goes high during periods when the output of receiver 24 is low or "drops out". The output of squaring amplifier 44 is sent to another or receive phase-locked-loop detector 48.

The receive PLL detector 48 includes a phase comparator 50, a filter circuit 52 with a hold switch controlled by the output of circuit 46, and a voltage controlled oscillator 54. Thus, PLL 48 provides at 56 a voltage Vr which is proportional to the frequency fr of the receive signal R, less 40,000 Hz.

The voltages Vt and Vr are coupled to a difference amplifier 58 which generates an output voltage Vo which is proportional to $\Delta f = (fr - ft)$, which, in turn, is proportional to the vehicle ground speed. Preferably, the reference PLL 34 will be mounted near the receive PLL 48 and will have the same type of temperature sensitive components. Since reference PLL 34 is directly driven by the transmit signal T and since outputs of PLLs 34 and 48 are subtracted from each other, this will eliminate drift in the output signal Vg due to temperature induced drift in the oscillator 32 or in components common to PLLs 34 and 48.

Figure 7:
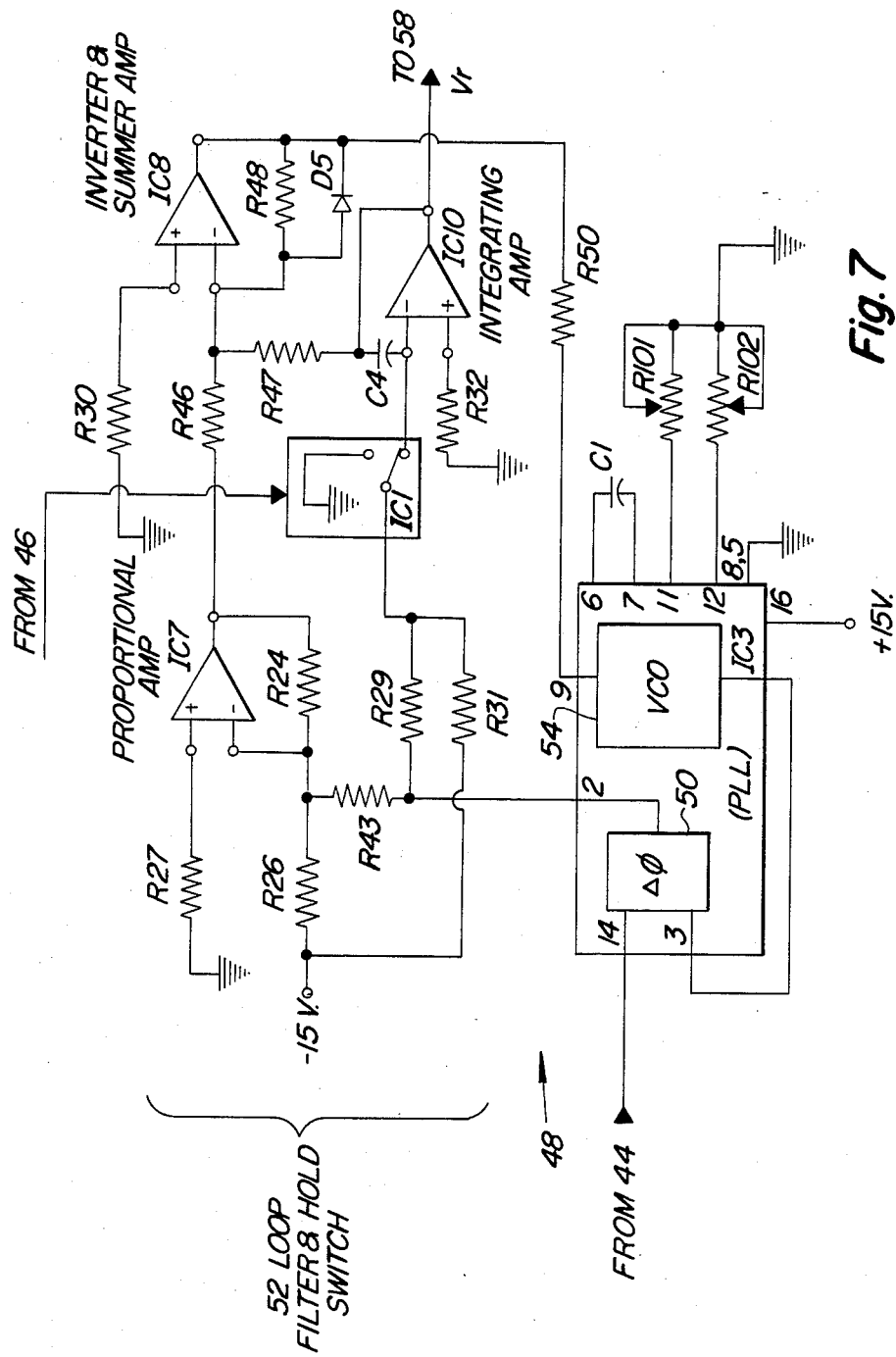

For further details relating to the circuit of FIG. 2, the reader is referred to FIGS. 3–7 and the table of suggested component values which follows this discussion. Beyond this, it should be pointed out, as best seen in FIG. 7, that the receive PLL 48 includes an integrating amplifier IC10 (with feedback capacitor C4). The output of phase comparator 50 is coupled to an input of the integrating amp IC10 via voltage control switch IC1 and to a proportional amplifier (IC7). Switch IC1 operates so that when the output from circuit 46 is low (when no signal drop-out condition exists) then the input of IC10 is coupled to the output of phase comparator 50 so that the output Vr of IC10 will continuously vary in magnitude proportional to changes in the frequency of received signal R. However, when the magnitude of R "drops out", then the output of drop-out detector circuit 46 goes high, causing switch IC1 to disconnect the output of phase comparator 50 from the input of IC10. Thus, when received signal drop-out occurs, the output Vr of IC10 will remain unchanged until the drop-out condition ceases.

The output of proportional amp IC7 and the output Vr of IC10 are summed together by inverter and summing amp IC8. The output of IC8 is coupled to an input of VCO 54 to complete the phase locked loop circuit 48.

| Table of Suggested Component Values (FIGS. 3-7) | |
|---|---|
| Resistor (Ohms) | |
| R1 - 249k, 1% | R31 - 80.6k, 1% |
| 2 - 49.9k, 1% | 32 - 30k, ¼ w |
| 5 - 18k, ¼ w | 33 - 1k, ¼ w |
| 6 - 10k, ¼ w | 34 - 4.98k, 1% |
| 7 - 10k, ¼ w | 35 - 4.99k, 1% |
| 8 - 20k, 1% | 36 - 1k, ¼ w |
| 9 - 20k, 1% | 37 - 20k, 1% |
| 10 - 10k, 1% | 38 - 10k, 1% |
| 11 - 249k, 1% | 39 - 10k, 1% |
| 12 - 44.9k, 1% | 40 - 220, ¼ w |
| 13 - 10k, ¼ w | 41 - 7.5k, ¼ w |
| 14 - 4.7k, ¼ w | 42 - 20k, 1% |
| 15 - 220, ¼ w | 43 - 40.2k, 1% |
| 16 - 2200k 1% | 44 - 220, ¼ w |
| 17 - 2.7k, ¼ w | 45 - 1k, ¼ w |
| 18 - 10k, ¼ w | 46 - 10k, 1% |
| 19 - 10k, ¼ w | 47 - 10k, 1% |
| 20 - 200k, 1% | 48 - 10k, 1% |
| 21 - 20k, 1% | 49 - 10k, 1% |
| 22 - 10k, ¼ w | 50 - 10k, ¼ w |
| 23 - 100, ¼ w | 51 - 10k, ¼ w |
| 24 - 10k, ¼ w | 52 - 10k, ¼ w |
| 25 - 220, ¼ w | 53 - 12k, ¼ W |
| 26 - 80.6k, 1% | (Match R38 + R49 to 0.1%) |
| 27 - 3.3k, ¼ w | |
| 28 - 4.42k, 1% | |
| 29 - 40.2k, 1% | |
| 30 - 3.3k, ¼ w | |

Integrated Circuits
IC1 - Digitally Controlled Analog Switch AD7512 DI
IC2, IC3 - Phase Locked Loop EGC 890 (Sylvania)
IC4, 7, 8 and 9 - Standard OP Amp 741
IC5, 6 and 10 - High Performance Op. Amp LF 356 B
IC11 - Comparator LM 311
IC12 - Comparator LM 357

| Capacitors (Mf = microfarads) | Potentiometers |
|---|---|
| C1 - .001 Mf - poly | R101 - 100k |
| 2 - .001 Mf - poly | 102 - 25k |
| 3 - .01 Mf | 103 - 5k |
| 4 - 1 Mf - poly | 104 - 50k |
| 5 - 100 pf | 105 - 1k |
| 6 - .001 Mf | 111 - 100k |
| 7 - 1 Mf | 112 - 25k |
| 8 - 1 Mf | |
| 9 - .01 Mf | |
| 10 - 1 Mf Monolithic | Pots R101 and R111 are preferably |
| 11 - 1 Mf Monolithic | adjusted so that the fmax of VCOs |
| 12 - 1 Mf Monolithic | 54 and 40 is 43 kHz at 15 volts. |
| 13 - 1 Mf | Pots R102 and R112 are preferably |
| 14 - .02 Mf | adjusted so that the fmin of VCOs |
| | 54 and 40 is 37 kHz at 0 volts. |

Diodes
D1 - 1N914
D2 - 1N914
D3 - 1N821
D4 - 1N821
D5 - 1N914
D6 - 1N914
D7 - 1N914

DESCRIPTION OF THE PREFERRED EMBODIMENT

Figure 8:
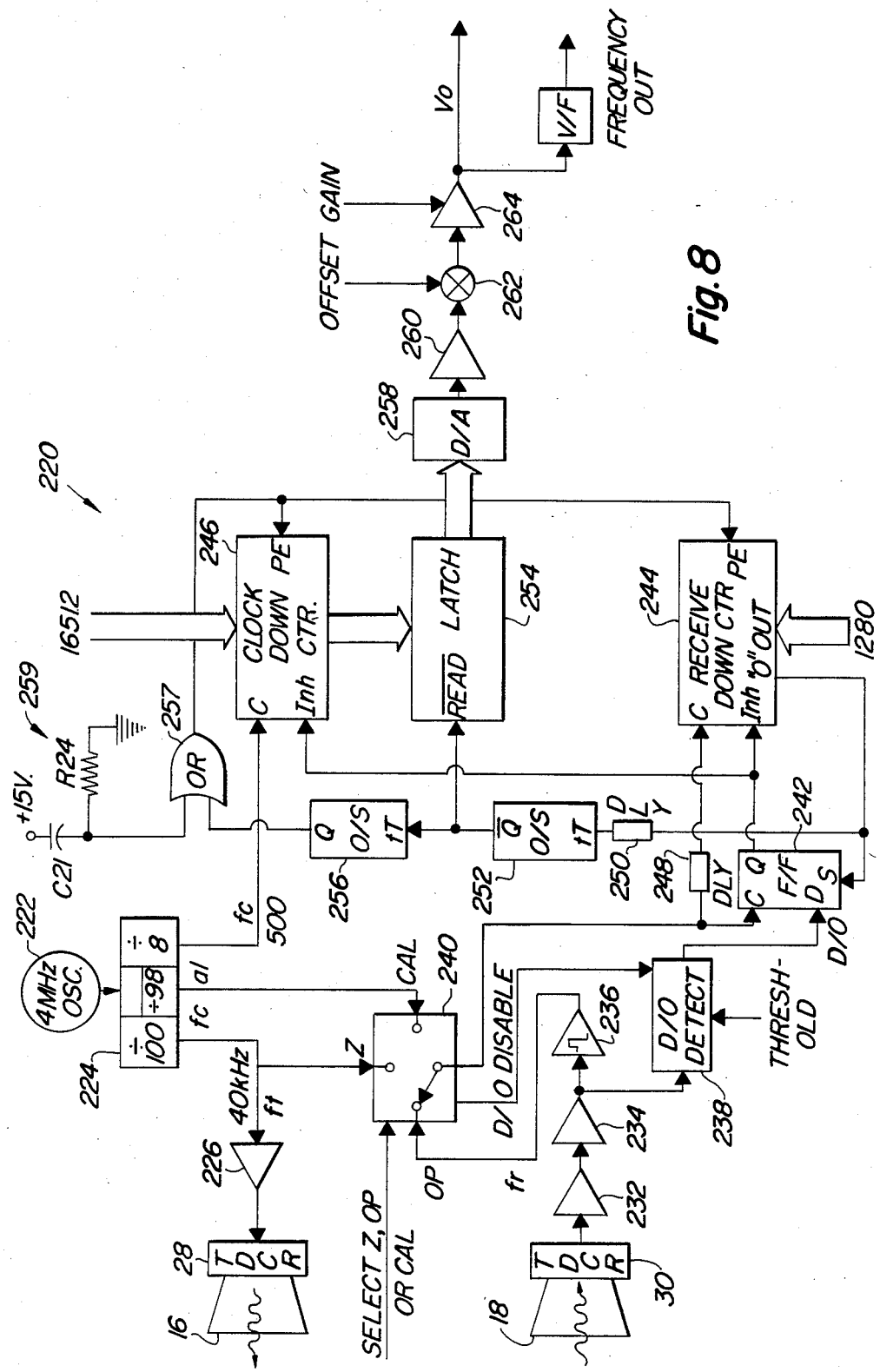
FIG. 8 is a schematic block diagram of a preferred embodiment of a signal processing unit, according to the present invention.
Figure 9:
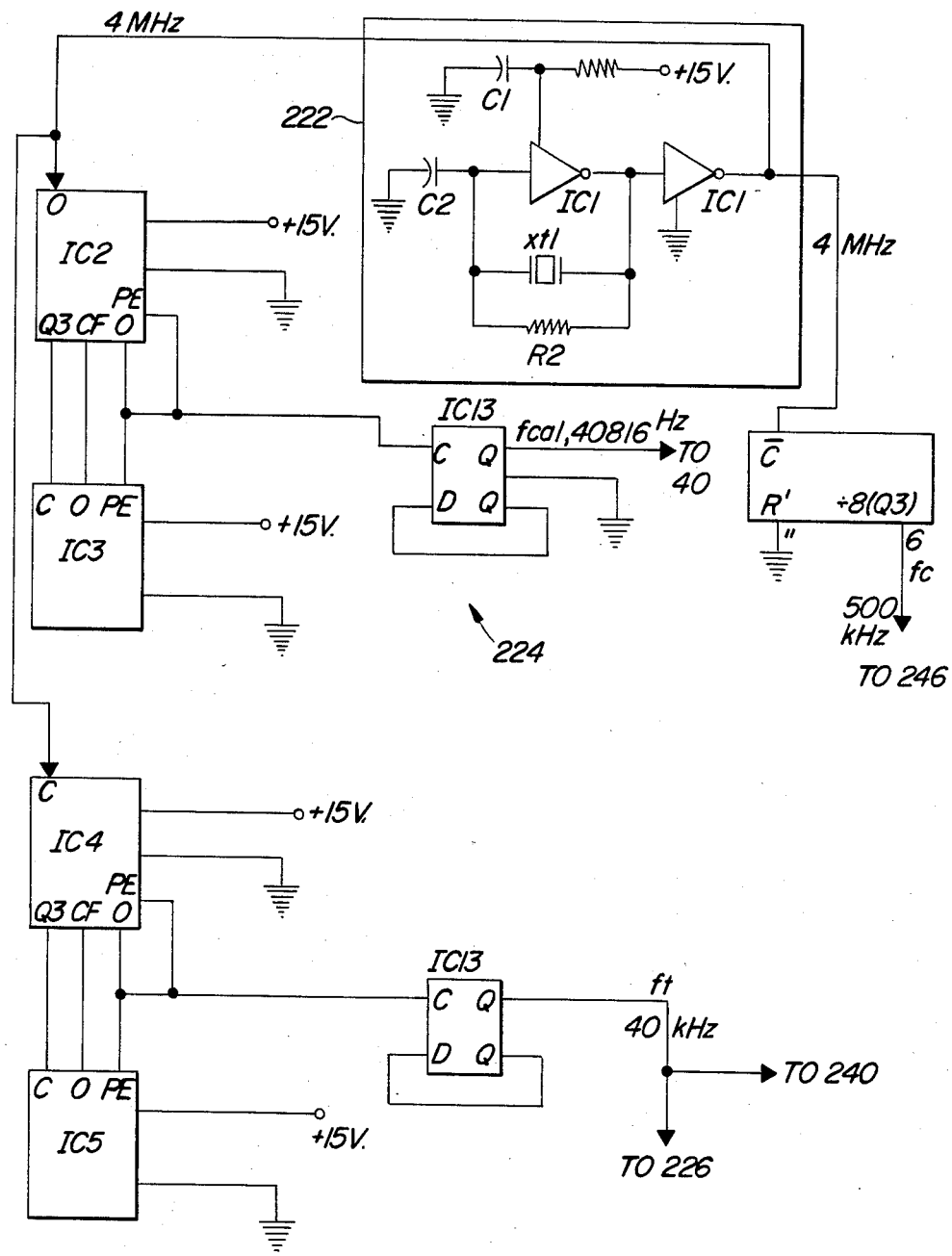
FIGS. 9–15 are detailed circuit diagrams of various portions of FIG. 8.
Figure 10:
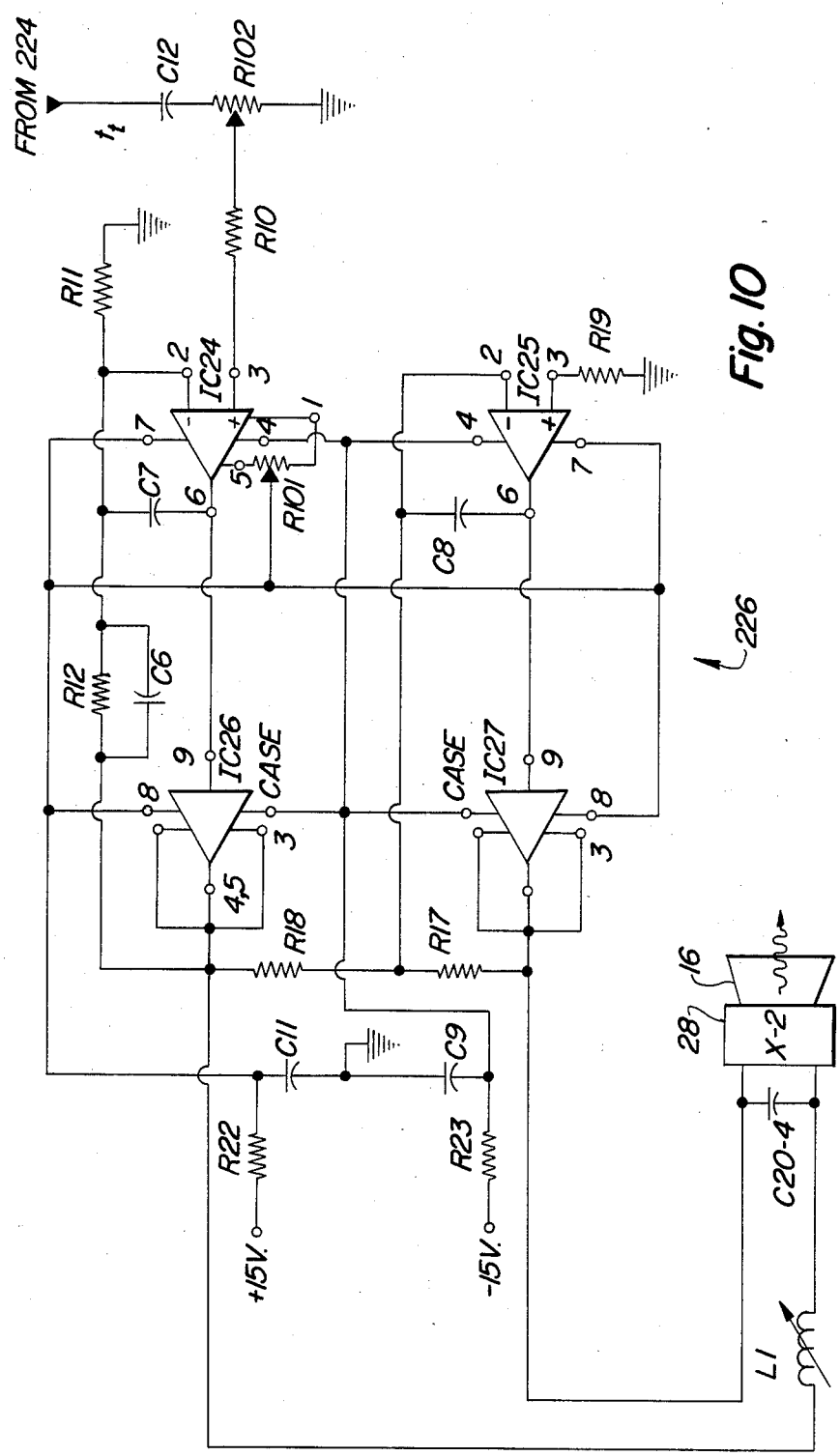

As best seen in FIG. 8, the signal processing circuit 220 includes an oscillator 222 with a 4 MHz master clock frequency which is applied to a frequency divider unit 224. Unit 224 provides a 40 kHz transmit frequency signal, a 500 kHz clock frequency, fc, and a calibrate frequency, fcal, of 40,816 Hz. The 40 kHz signal is transmitted via power amplifier 226 to transducer 28 and transmit horn 16, which generates the 40 kHz ultrasonic transmit signal.

The reflected ultrasonic signal is received by horn 18 and receiver transducer 30 which generates the reflected signal R with frequency fr. The signal R is amplified by preamp 232 and by receiver amplifier 234 and is then applied to inputs of squaring circuit 236 and of drop-out detect circuit 238. The output of drop-out detect circuit 238 is normally low, but goes high when the peak amplitude of the output of amp 234 stays below a threshold of 2.0 volts, for example.

A switch 240 receives the transmit frequency ft and the calibrate frequency fcal from 224 and receives the reflected frequency fr from 236. Switch 240 couples a selected one of these frequencies to the C input of a synchronizing flip-flop 242 and to the C input of receive down counter 244 via 1 microsecond delay 248. An inhibit or disable drop-out output of switch 240 is coupled to the drop-out detector 238.

The D or data input of D-type flip-flop 242 is coupled to the output of drop-out detect circuit 238, the set S input is coupled to the "0-out" terminal of receive down counter 244, and the Q output is coupled to the inhibit, Inh, inputs of receive down counter 244 and of clock down counter 246.

The receive down counter 244 also has its clock input coupled to the output of switch 240 via 1 microsecond delay 248. A 12-bit binary word (equal to decimal 1280, for example,) is applied to the preset data pins of down counter 244. The "0-out" terminal of down counter 244 is also coupled via 1 microsecond delay 250 to the +T input of monostable multivibrator or one-shot 252. The inverted $\overline{Q}$ output of "latch" one-shot 252 is coupled to the inverted read input of latch 254 and to the +T input of monostable multivibrator or one-shot 256. The Q output of "preset" one-shot 256 is coupled to the preset control inputs of clock and receive down counters 246 and 244 via OR gate 257. OR gate 257 also is coupled to a resistor and capacitor circuit 259. Circuit 259 and OR gate 257 operate to reset counters 244 and 246 when the system power (from which +15 volts is derived) is turned on.

The clock input C of down counter 246 receives the 500 kHz frequency fc from frequency divider unit 224. The 12 least significant bits of a binary word (equal to 16,000+512 or binary 100 0000 1000 0000) are applied to the preset data pins of clock down counter 246. The number 16,000 is equal to the number of the cycles of the clock frequency fc which will occur in the time taken up by 1280 cycles of the transmit frequency ft . . . (500,000÷40,000)×1280. The contents of the down counter 246 is communicated to latch 254 via a 10 bit data bus.

The latch 254 is coupled via a 10 bit data bus to a digital to analog converter 258 and to output amplifer 260. An offset level may be applied via summer 262 and the scaling amplifier provides the output voltage Vo.

The clock down counter preset offset of 512 is chosen so that the full range of forward and reverse speeds of the vehicle can be represented by positive clock down counter valves. This is necessary if the D/A converter 258 treats all digital numbers from latch 254 as positive. However, if a D/A converter with negative number capability is used, then no offset is needed. In this latter case, the resulting final clock down counter numbers would be positive for forward speeds, zero for zero speeds and negative for reverse speeds.

MODE OF OPERATION OF PREFERRED EMBODIMENT

During normal operation, the switch 240 selects the fr frequency from squaring amp 236. Down counters 244 and 246 are simultaneously preset to predetermined numbers upon generation of a preset pulse by preset one-shot 256. Receive down counter is preset to 1280 (binary 10100000000). Clock down counter is preset to the 12 least significant bits of 16512 which is binary 000 1000 0000.

Then, assuming no signal drop-out condition is detected by drop-out detector 238, the receive down counter 244 counts down at a rate equal to the frequency fr of the reflected signal, which frequency is applied to the clock input C of receive down counter.

By rewriting the Doppler equation, (1), it follows that the frequency shift $\Delta F = fr - ft$ is approximately 82.87 Hz per mile per hour of ground speed Vg:

$$\Delta f = (Vg \times ft \times 2 \cos a) \div c \qquad (2)$$

Thus, it follows that receive down counter 244 will generally count down from 1280 to 0 in around approximately 30.727 miliseconds for a forward ground speed of 20 mph, in 32 miliseconds for a ground speed of 0.0 mph, and in approximately 32.335 miliseconds for a rearward ground speed of 5 mph. Thus, receive down counter 244 establishes a variable time interval equal to the time occupied by a predetermined number of cycles of the reflected frequency fr. At the same time, the 500 kHz square wave clock frequency fc from frequency divider 224 is applied to the clock input c of clock down counter 246 so that it counts down from its preset value at a 500 kHz rate. The counters 244 and 246 continue counting down at their respective rates until receive down counter 244 reaches 0, at which point its 0-out output generates a low-to-high transition (0-1). This 0-1 transition is applied to the set S input of flip-flop 242 so that the normally low Q output of flip-flop 242 and the INH inputs of both down counters 244 and 246 go high, thus inhibiting further down counting by both down counters 244 and 246.

After a 1 microsecond delay due to delay 250, the 0-1 transition of the 0-out of 244 also causes latch one-shot 252 to generate a negative 1 microsecond pulse. The positive going (or trailing) edge of this pulse causes latch 254 to read the contents of clock down counter 246. To a very close approximation, the final number N in the clock down counter 246 will be defined by the equation:

$$N = ((\Delta f \times Nc \times Nd) \div (ft \times Nt)) + 512 \qquad (3)$$

where $\Delta f$ is equal to $fr - ft$, Nc is the number of receive cycles over which the receive period is measured (1280), Nd is the ratio of the master clock frequency (4 MHz) to the transmit frequency ft (40 KHz) and Nt is the ratio of master clock frequency to the clock counter input frequency (500 kHz). For example, for ground speeds of forward, 20 mph, 0 mph and reverse 5 mph, the latch 254 will contain values of approximately 1173, 512 and 345, respectively. Thus, the contents of latch 254 is linearly related to ground velocity. This can also be shown by substituting equation (2) for $\Delta f$ in equation (3) to obtain the following equation:

$$N = ((Vg \times 2 \cos a \times Nc \times Nd) \div (Nt \times c)) + 512. \qquad (4)$$

Thus, it can be seen that the final count number N is dependent only on the physical quantities Vg and $a$ and on the digital quantities Nc, Nd, and Nt. It is insensitive to drift in the 4 MHz master clock frequency since this frequency is cancelled out in the derivation of equation 4.

Now, the negative pulse from latch one-shot 252 also causes preset one-shot 256 to generate a positive 1 microsecond pulse which presets both counters 244 and 246 and returns the 0-out output of down counter 244 back to its initial low state. Then, the next rising edge of the pulse train from switch 240 resets Q of flip-flop 242 and the Inh inputs of counters 244 and 246 back to their initial low states so that counters 244 and 246 can start down counting again.

The D/A converter 258 converts the contents of latch 254 into an analog voltage so that, for example, a 1 count change in the latch contents corresponds to voltage change of 9.77 milivolts at the output of D/A converter 258. The output of D/A converter 258 is amplified by amplifier 260. Then, offset and scale factors may be applied via summer 262 and variable amp 264 to obtain an output voltage Vo which is proportional to the latch contents N, and thus, to the ground speed Vg.

Now, when the amplitude of the reflected signal R is at normal levels, then the output of drop-out detector 238 is low and the system operates as just described. However, the reflected signal amplitude may "drop out" due to variations in terrain reflectivity or due to destructive interference among wave fronts from the various reflecting areas of the terrain. This signal drop-out condition can cause a speed sensing system to produce erroneous ground speed values. In this preferred embodiment of the present invention, the output of the drop-out detect circuit 238 and the D input of flip-flop 242 go high when this drop-out condition occurs. Then, on the next rising edge of the pulse train from switch 240, the Q output of flip-flop 242 goes high, thus inhibiting both down counters 244 and 246, as long as the drop-out condition exists.

When the drop-out condition ends, the output of drop-out detect circuit 238 and the D input of flip-flop 242 go back low. Then, on the next low to high transition of the pulse train from 240, the Q out of flip-flop 242 goes back low and down counters 244 and 246 resume counting. In this manner, the drop-out condition does not degrade the velocity information.

A testing capability is provided for this system by the addition of switch 240. In the normal operating position (shown), switch 240 connects the output of squaring circuit 236 to receive down counter 244 so that the system operates as described previously. If switch 240 is in the "zero" position, then the 40 kHz transmit frequency is coupled to receive down counter 244 so that if the system is operating properly, the contents of latch 54 will indicate a zero ground speed. If switch 240 is in its "CAL" position, then a calibrate frequency fcal of 40.816 kHz is coupled to receive down counter 244 so that the contents of latch 254 should indicate a predetermined forward ground speed. When switch 240 is in the "zero" or "calibrate" positions, it causes drop-out detector 238 to remain in its low output state so that a drop-out condition does not interfere with the test function.

It should be understood that this invention could be used to sense velocities other than vehicle ground speed. For example, if the horns 16 and 18 were aimed at a rotating tire, a measure of tire rotation speed could be obtained. Similarly, if the horns were aimed at any object moving with respect to the horns, such as a straw mat moving through a combine, then this invention would sense the velocity of that moving object.

The following are tables of the recommended values for the components shown in the preferred embodiment of FIGS. 9-15. Table A corresponds to FIGS. 9, 10 and 12-14. Table B corresponds to FIG. 15 and elements 234 and 236 of FIG. 11. Table C corresponds to elements 230 and 232 of FIG. 11.

TABLE A
(FIGS. 9, 10 and 12-14)

Resistors (Ohms)

| | |
|---|---|
| R1 - 100Ω, ¼ W | |
| 2 - 4.7 M, ¼ W | |
| 3 - 4.7k, ¼ W | |
| 4 - 4.7k, ¼ W | |
| 5 - 1k | R17-6 - 1k, ¼ W |
| 6 - 1k | 18-6 - 30k, ¼ W |
| 7 - 10k, ¼ W | 19-6 - 1 M, ¼ W |
| 8 - 10k, ¼ W | 21-6 - 10k, ¼ W |
| 10 - 10k, ¼ W | 22-6 - 10k, ¼ W |
| 11 - 10k, 1% | R38-6 - 10k, ¼ W |
| 12 - 40.2k, 1% | R55-6, R56-6 - 100Ω, ¼ W |
| 17 - 10k, 1% | |
| 18 - 10k, 1% | |
| 19 - 4.7k, ¼ W | |
| 21 - 10Ω, ½ W | |
| 22 - 10Ω, ½ W | |
| 23 - 10Ω, ½ W | |
| 24 - 10k, ¼ W | |
| 25 - 10k, ¼ W | |
| 26 - 10k, ¼ W | |
| 27 - 30k, ¼ W | |
| 28 - 447k, ¼ W | |
| 29 - 100k, ¼ W | |
| 30 - 2 M, ¼ W | |
| 31 - 150k, ¼ W | |

Integrated Circuits

| | |
|---|---|
| IC1 - 4011 | IC15 - MC14526 |
| 2 - MC14526 | 16 - MC14526 |
| 3 - MC14526 | 17 - MC14526 |
| 4 - MC14526 | 18 - MC14526 |
| 5 - MC14526 | 19 - MC14526 |
| 6 - 4093 | 20 - MC14526 |
| 7 - CD4098 | 21 - 4042 |
| 8 - CD4098 | 22 - 4042 |
| 9 - CD4098 | 23 - 4042 |
| 10 - 4071 | 24 - LF356 |
| 11 - 4011 | 25 - LF356 |
| 12 - 4013 | 26 - MC1438R |
| 13 - 4013 | 27 - MC1438R |
| 14 - 4011 | 2-6 - 339 |

Potentiometers    Diodes

| | |
|---|---|
| R101 - 25k, 20T - Type 89X | D1 - IN914 |
| 102 - 10k, 20T - Type 89X | |
| R101-6 - 2k, 20T - Helipot type 66W | |

Crystal    Transducer

| | |
|---|---|
| Xt1 - 4.0 MHz | X-2 Massa TR89 Type 40 |

Socket    Inductors

| | |
|---|---|
| 14 pin DIP | L1, 2.88 mH Cambion 558-106-31 |

Capacitors (mf = microfarad)

All capacitors ceramic or monolithic

| | |
|---|---|
| C1 - 1 Mf | VC24 - 100 pf |
| 2 - 33 pf | 25 - 330 pf |
| 4 - .1 Mf | 26 - .002 Mf |
| 5 - .1 Mf | 27 - .01 Mf |
| 6 - .1 Mf | 28 - 100 pf |
| 7 - .1 Mf | 29 - 100 pf |
| 8 - .1 Mf | 30 - 1 Mf |
| 9 - 47 Mf | 31 - 1 Mf |
| 11 - 47 Mf | 32 - 1 Mf |
| 12 - 1 Mf | 33 - 1 Mf |
| 13 - .1 Mf | 34 - 1 Mf |
| 14 - .1 Mf | 35 - 1 Mf |
| 15 - 100 pf | 36 - 1 Mf |
| 16 - 100 pf | 37 - 1 Mf |
| 17 - .1 Mf | 38 - 1 Mf |
| 18 - .1 Mf | 39 - 1 Mf |

TABLE A-continued
(FIGS. 9, 10 and 12-14)

| | |
|---|---|
| 19 - .1 Mf | C17-6 - 1 Mf Monolithic |
| 20 - .1 Mf | C27-6 - Optional |
| 21 - 1 Mf | C28-6 - Optional |
| 22 - 47 Mf | C20-4 - .003 Mf |
| 23 - Decoupling | |

Note:
(a) C1, C4, C5, C13-C19 should be mounted as close as possible to their associated integrated circuit.
(b) L1, R20-4, R103-4, C20-4 are mounted in case of transmitter horn 16.

Figure 11:
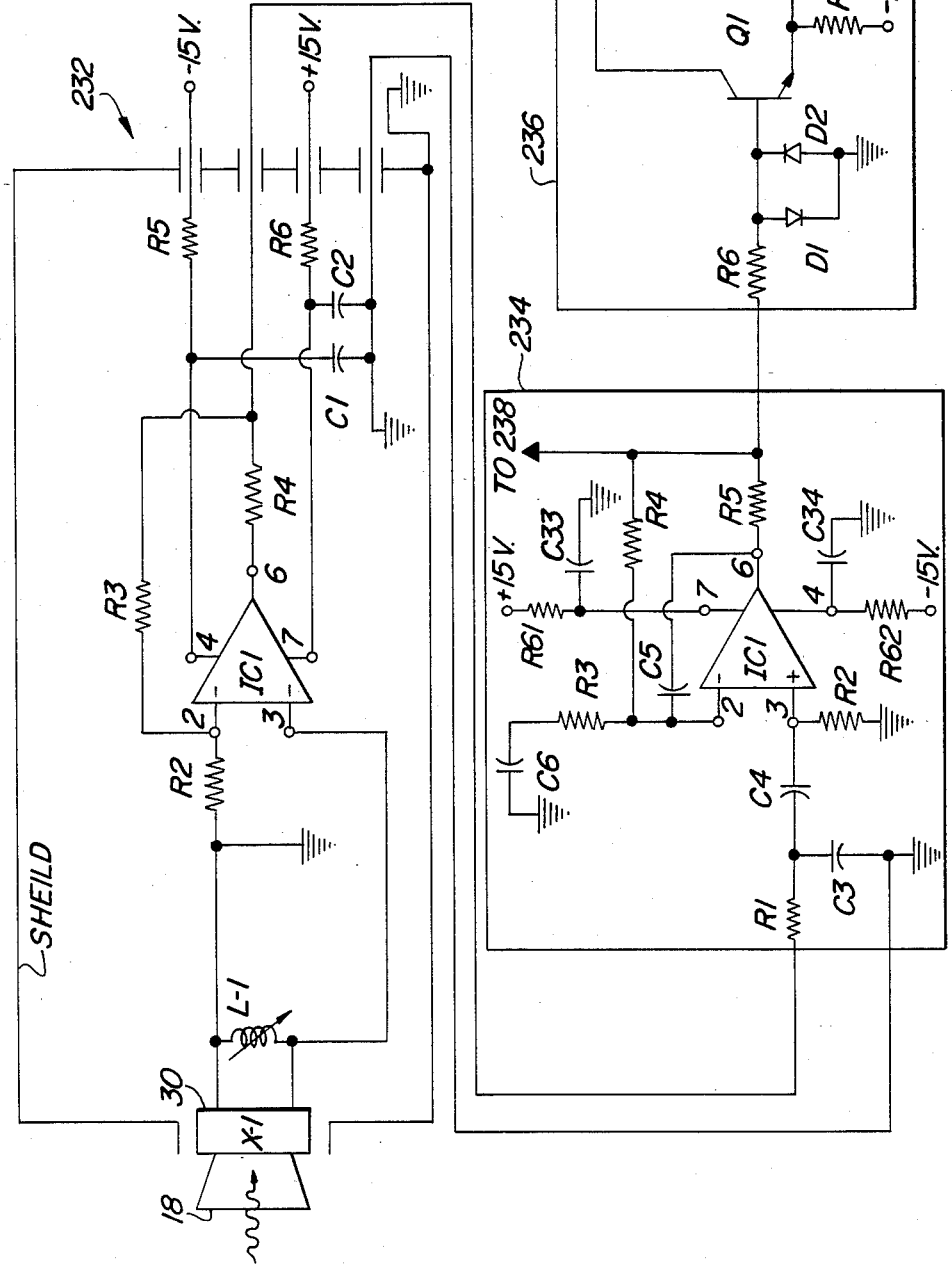
Figure 12:
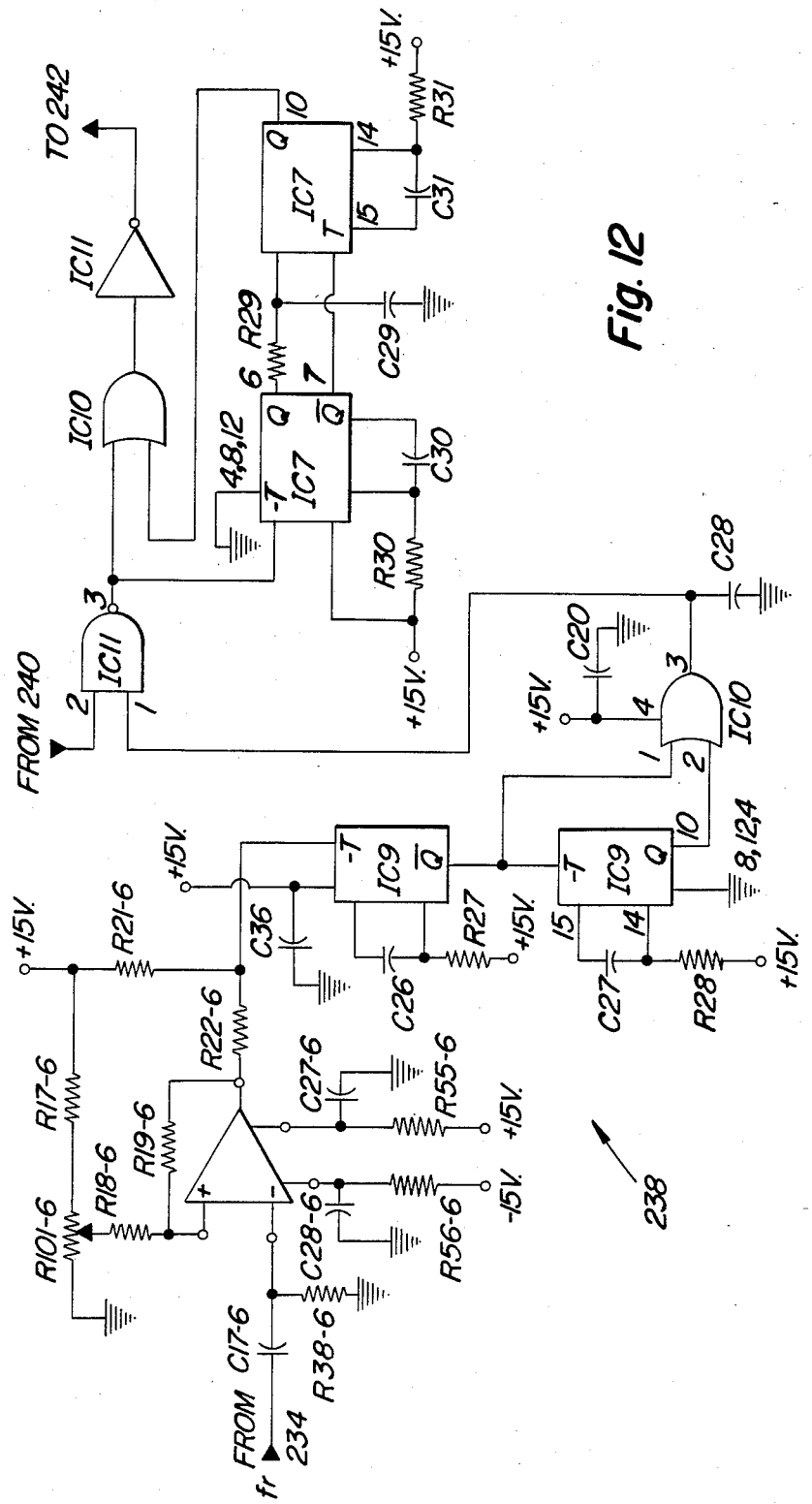
Figure 13:
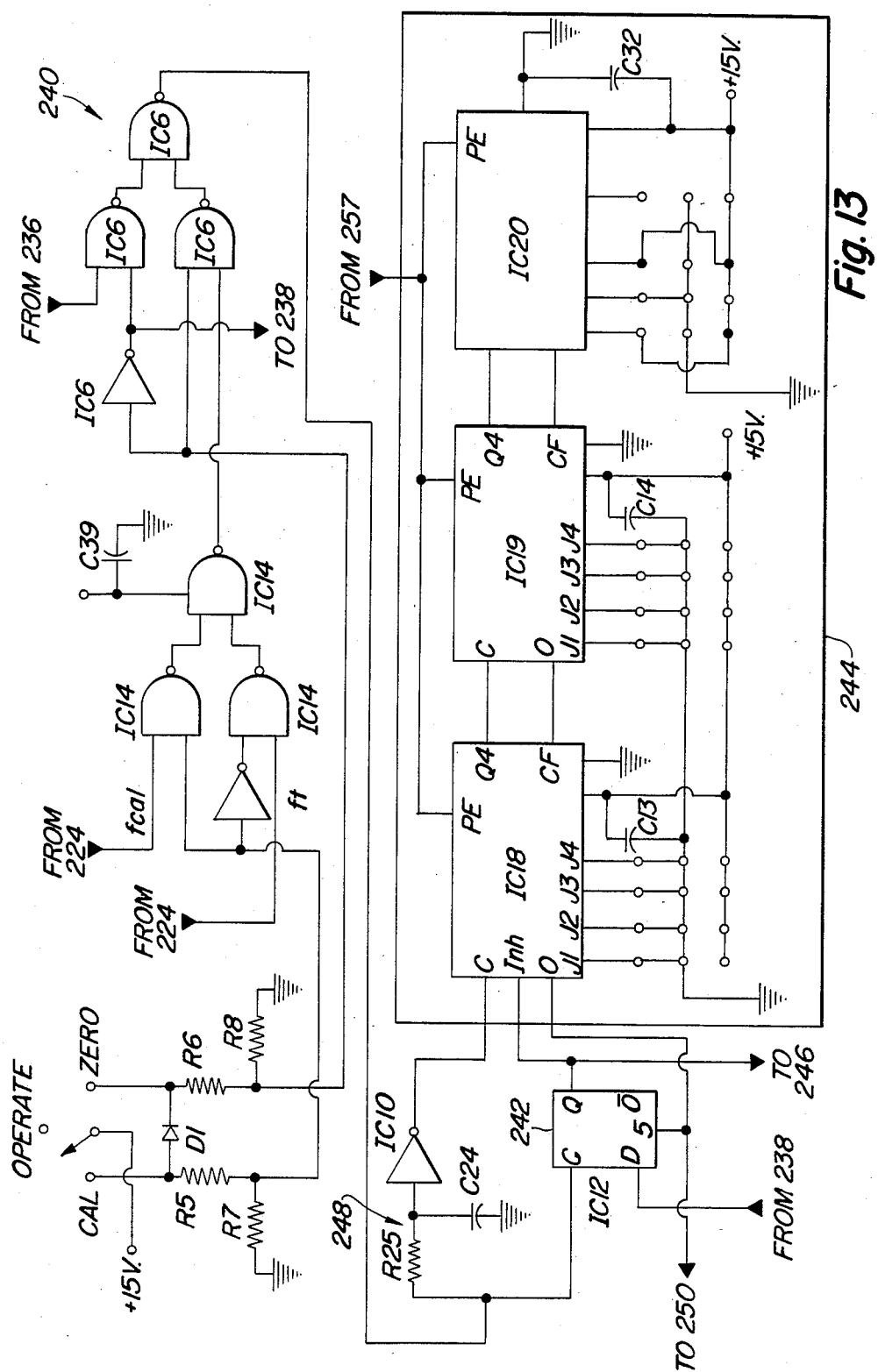
Figure 14:
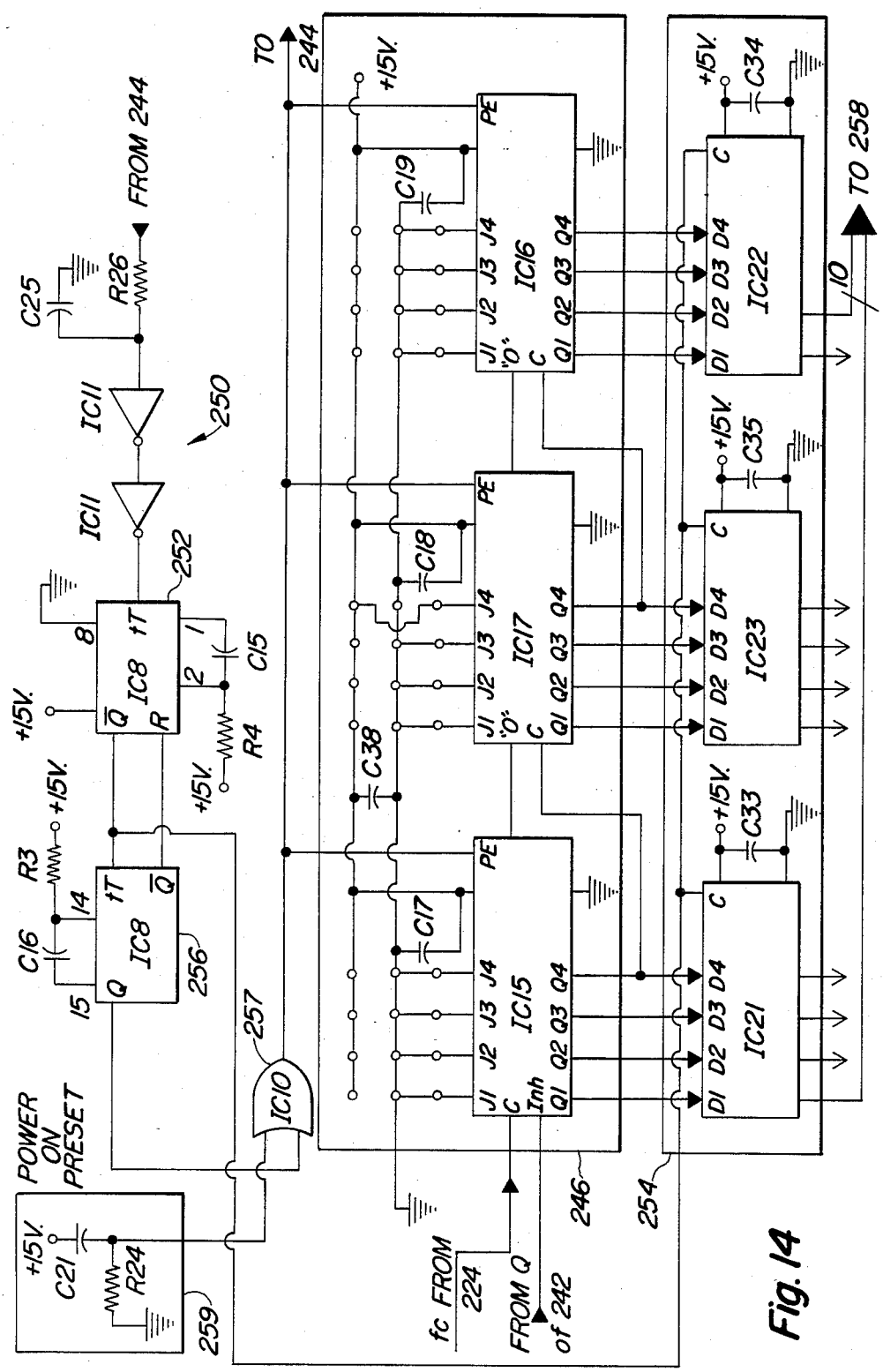
Figure 15:
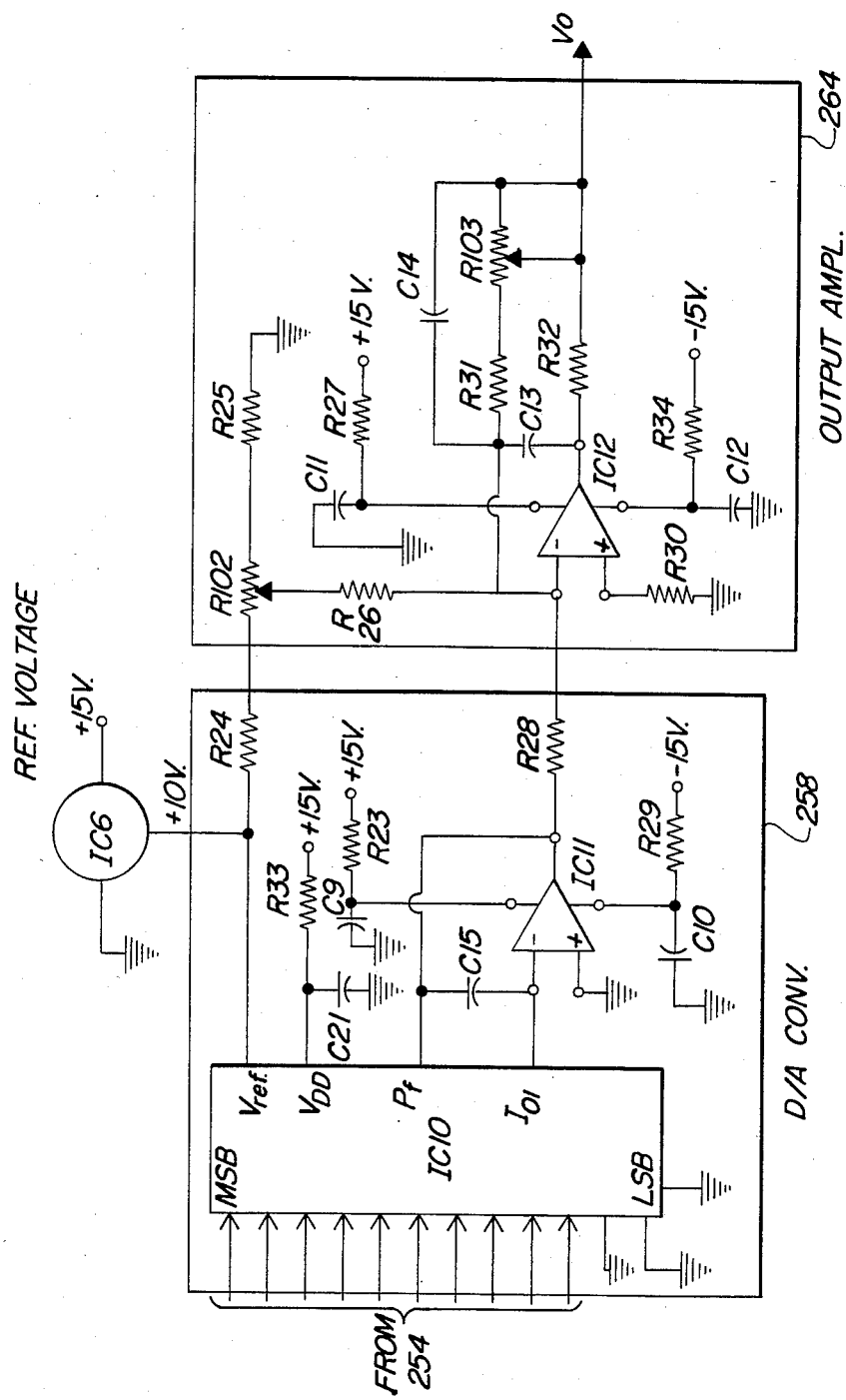

TABLE B
(FIG. 15, 234 and 236 of FIG. 11)

Resistors (Ohms)

| | |
|---|---|
| R1 - 220Ω, ¼ W | R35 - 10Ω, ½ W |
| 2 - 10k, ¼ W | 36 - 10Ω, ½ W |
| 3 - 100Ω, ¼ W | 37 - 100Ω, ¼ W |
| 4 - 10k, ¼ W | 39 - 20Ω, 1% |
| 5 - 220Ω, ¼ W | 40 - 10k, 1% |
| 6 - 10k, ¼ W | 41 - 4.7k, ¼ W |
| 7 - 10k, ¼ W | 42 - 20k, 1% |
| 9 - 10k, ¼ W | 43 - 20k, 1% |
| 10 - 10k, ¼ W | 44 - 20k, 1% |
| 11 - 20k, 1% Optional | 45 - 10k, 1% |
| 12 - 20k, 1% Optional | 46 - 40.2k, 1% |
| 13 - 20k, 1% Optional | 47 - 20k, 1% |
| 14 - 10k, 1% Optional | 48 - 4.7k, ¼ W |
| 15 - 200k, ¼ W Optional | 49 - 15k, 1% |
| 16 - 4.7k, ¼ W Optional | 50 - 4.7k, ¼ W |
| 23 - 100Ω, ¼ W | 51 - 270Ω, 2 W |
| 24 - 200Ω, 1% | 52 - 100Ω, ¼ W |
| 25 - 200Ω, 1% | 53 - 100Ω, ¼ W |
| 26 - 27.4k | 54 - 100Ω, ¼ W |
| 27 - 100Ω, ¼ W | 57 - 100Ω, ¼ W |
| 28 - 27.4k | 58 - 100Ω, ¼ W |
| 29 - 100Ω, ¼ W | 59 - 100Ω, ¼ W |
| 30 - 3.3k, ¼ W | 60 - 100Ω, ¼ W |
| 31 - 20k | 61 - 100Ω, ¼ W |
| 32 - 220Ω, ¼ W | 62 - 100Ω, ¼ W |
| 33 - 100Ω, ¼ W | 63 - 10k, ¼ W |
| 34 - 100Ω, ¼ W | 64 - 1k, (Optional) |

Capacitors

| | |
|---|---|
| C1 - 47 Mf | C17 - 1 Mf Monolithic |
| 2 - 1 Mf | 18 - .015 Mf Polystyrene |
| 3 - .001 Mf | 19 - .05 Mf Polystyrene |
| 4 - 1 Mf | 20 - .1 Mf |
| 6 - 1 Mf | 21 - 1 Mf |
| 7 - 1 Mf | 23 - 1 Mf |
| 8 - .002 Mf | 24 - 1 Mf |
| 9 - 1 Mf | 24 - 1 Mf |
| 10 - 1 Mf | 25 - 1 Mf |
| 11 - 1 Mf | 26 - 1 Mf |
| 12 - 1 Mf | 27 - 1 Mf |
| 13 - 100 pf | 28 - 1 Mf |
| 14 - SAC (1 to 10 Mf) | 29 - 1 Mf |
| 15 - 1 Mf | 30 - 1 Mf |
| 16 - .1 Mf | 31 - 1 Mf |
| 17 - 1 Mf Monolithic | 32 - 1 Mf |
| 18 - .015 Mf Polystyrene | 33 - 1 Mf |
| 19 - .05 Mf Polystyrene | 34 - 1 Mf |
| 20 - .1 Mf | |

(R64, C21-C26 and C29-C34 are optional), (C1-C13 may be disc or monolithic)

Potentiometers    Transistors

| | |
|---|---|
| 102 - 2k, 20T Helipot Type 66W | Q1 - 2N2914 |
| 103 - 100k, 20T Helipot Type 66W | 2 - 2N3904 |
| 104 - 25k, 20T Helipot Type 66W | 3 - 2N3906 |
| 105 - 10k, 20T Helipot Type 66W | |

Switches    Diodes

| | |
|---|---|
| Sw1 - Slide switch, PC Mount | D1 - IN914 |
| | 2 - IN914 |

Integrated Circuits

| | |
|---|---|
| IC1 - LF 357 | 3 - IN914 Optional |
| 3 - LF 357 Optional | 4 - IN914 Optional |
| | 5 - IN914 |

TABLE B-continued
(FIG. 15, 234 and 236 of FIG. 11)

4 - LF 359 Optional     6 - IN914
5 - 78L05
6 - AD584
7 - 4013
8 - VFC32KP, Burr Brown
9 - 4558
10 - AD7541k, Analog Devices
11 - 3527AM, Burr Brown
12 - LF355

TABLE C
(230 and 232 of FIG. 11)

| Resistors | Capacitors |
|---|---|
| 2 - 10k, ¼ W | C1 - 1 Mf |
| 3 - 100k, ¼ W | 2 - 1 Mf |
| 4 - 220Ω, ¼ W | |
| 5 - 100Ω, ¼ W | |
| 6 - 100Ω, ¼ W | Integrated Circuit |
| | IC - LF 356 |

Inductor
L1 - 6.3 Mh Cambian 558-3387-30 (5.4–8.2 mn)
Transducer
X-1 Massa TR89, Type 40

While the invention has been described in conjunction with a specific embodiment, it is to be understood that many alternatives, modifications and variations will be apparent to those skilled in the art in light of the aforegoing description, for example, use of radar instead of acoustic waves. Accordingly, this invention is intended to embrace all such alternatives, modifications and variations which fall within the spirit and scope of the appended claims.

What is claimed is:

1. In a radar or sonic velocity sensor for sensing the velocity of an object moving relative to the sensor, the velocity sensor being of the type having a single transmitter for directing a transmit frequency signal towards the object and having a single receiver for receiving a variable magnitude unmixed signal reflected from the object, the velocity sensor having first means for determining velocity data from a velocity dependent frequency derived from the variable magnitude unmixed signal reflected from the object and from a predetermined fixed frequency signal, said first means operating without mixing the variable magnitude signal with the fixed frequency signal and having second means for limiting the effect of reflected signal degradation upon derivation of the velocity data, the improvement wherein the variable magnitude reflected signal is received by an input of the second means and the second means has an output coupled to an input of the first means.

2. The velocity sensor of claim 1, wherein the second means comprises:
a drop-out detector for sensing fluctuations in the average magnitude of the reflected signal and for generating a drop-out signal only when the average magnitude is below a predetermined threshold; and
the first means comprises a phase-locked-loop circuit responsive to the velocity dependent frequency for generating an output signal which varies in response to changes in the velocity dependent frequency and thus, to changes in object velocity, the phase-locked-loop circuit including hold means responsive to the dropout detector for preventing variations of the output signal when the drop-out detector is generating the first signal.

3. The velocity sensor of claim 2, wherein the drop-out detector comprises:
a rectifier for rectifying the reflected signal; and
a comparator having a first input coupled to receive said predetermined threshold, a second input coupled to receive the rectified reflected signal and an output which is coupled to the hold means.

4. The velocity sensor of claim 1, wherein:
the first means comprises period measuring means for measuring the period of a predetermined number of cycles of said velocity dependent frequency; and
the second means includes means for preventing the measured period from being influenced when the reflected signal has a magnitude which falls below a threshold.

5. A radar or sonic velocity sensor for sensing the velocity of an object moving relative to the sensor, the velocity sensor comprising:
first means for determining velocity data from a velocity dependent frequency derived from a variable magnitude signal reflected from the object and from a predetermined fixed frequency, the first means operating without mixing the variable magnitude signal with the fixed frequency; and
second means for limiting the effect of reflected signal degradation upon derivation of the velocity data, the variable magnitude reflected signal being received by an input of the second means and the second means having an output coupled to an input of the first means;
the second means comprising a drop-out detector for sensing fluctuations in the average magnitude of the reflected signal and for generating a drop-out signal only when the average magnitude is below a predetermined threshold, the drop-out detector comprising a rectifier for rectifying the reflected signal, an averaging circuit for generating an average signal representing an average amplitude of the rectified signal, and a comparator having a first input coupled to receive said threshold, a second input coupled to receive the average signal and an output which is coupled to the hold means;
the first means comprising a phase-locked-loop circuit responsive to the velocity dependent frequency for generating an output signal which varies in response to changes in the velocity dependent frequency and thus, to changes in object velocity, the phase-locked-loop circuit including hold means responsive to the drop-out detector for preventing variations of the output signal when the drop-out detector is generating the first signal.

6. A radar or ultrasonic velocity sensor for sensing the velocity of an object moving relative to the sensor, the velocity sensor comprising:
first means for determining velocity data from a velocity dependent frequency derived from a variable magnitude signal reflected from the object and from a predetermined fixed frequency; and
second means for limiting the effect of reflected signal degradation upon derivation of the velocity data, the variable magnitude reflected signal being received by an input of the second means and the second means having an output coupled to an input of the first means;
the second means comprising a drop-out detector for sensing fluctuations in the average magnitude of the reflected signal and for generating a drop-out signal only when the average magnitude is below a predetermined threshold;

the first means comprising a phase-locked-loop circuit responsive to the velocity dependent frequency for generating an output signal which varies in response to changes in the velocity dependent frequency and thus, to changes in object velocity, the phase-locked-loop circuit including hold means responsive to the drop-out detector for preventing variations of the output signal when the drop-out detector is generating the first signal;

the phase-locked-loop circuit comprising:

a phase comparator with one input coupled to receive the velocity dependent frequency, an output and another input;

a voltage controlled oscillator with an output coupled to the other input of the phase comparator and an input;

a switch having a first terminal coupled to the output of the phase comparator, a second terminal, and a third terminal coupled to receive the drop-out signal, the switch being operable to connect and disconnect the first and second terminals as a function of the drop-out signal which is applied to its third terminal;

an integrator having an input coupled to the second terminal of the switch and having an output; and a summing amplifier having a first input coupled to receive the output of the phase comparator, a second input coupled to receive the output of the integrating amplifier and an output coupled to the input of the voltage controlled oscillator.

7. A radar or sonic velocity sensor for sensing the velocity of an object moving relative to the sensor, the velocity sensor being of the type having a single transmitter for directing a transmit frequency signal towards the object and having a single receiver for receiving a variable magnitude unmixed signal reflected from the object, the velocity sensor comprising:

first means for determining velocity data from a velocity dependent frequency derived from the variable magnitude signal reflected from the object and from a predetermined fixed frequency signal, the first means operating without mixing the variable magnitude signal with the fixed frequency signal; and second means for limiting the effect of reflected signal degradation upon derivation of the velocity data, the variable magnitude refected signal being received by an input of the second means and the second means having an output coupled to an input of the first means;

the velocity sensor further comprising:

a first circuit responsive to the fixed frequency signal for generating a first signal proportional to the fixed frequency signal;

a drop-out detector for sensing fluctuations in the average magnitude of the reflected signal and for generating a drop-out signal only when the sensed magnitude is below a predetermined threshold;

a second circuit responsive to the velocity dependent frequency for generating a second signal which varies in response to changes in the velocity dependent frequency, the second circuit including a hold circuit for preventing variation of the second signal in response to generation of the drop-out signal; and a third circuit for generating an output signal with a magnitude which is proportional to the object velocity and which is a function of the first and second signals.

8. The velocity sensor of claim 7, wherein:

the first and second circuits each comprise a phase-locked-loop.

9. The velocity sensor of claim 7, wherein the drop-out detector comprises:

a rectifier for rectifying the reflected signal; and a comparator having a first input coupled to receive said predetermined threshold, a second input coupled to receive the rectified reflected signal and an output which is coupled to the hold circuit.

10. The velocity sensor of claim 7, wherein the second circuit comprises:

a phase comparator with an input coupled to receive the reflected signal and an output;

a voltage controlled oscillator with an output coupled to another input of the phase comparator and an input;

a switch having a first terminal coupled to the output of the phase comparator, a second terminal, and a third terminal coupled to receive the drop-out signal, the switch being operable to connect and disconnect the first and second terminals as a function of the drop-out signal which is applied to the third terminal;

an integrator having an input coupled to the second terminal of the switch and an output; and a summing amplifier having a first input coupled to receive the output of the phase comparator, a second input coupled to receive the output of the integrating amplifier and an output coupled to the input of the voltage controlled oscillator.

11. A radar or sonic velocity sensor for sensing the velocity of an object moving relative to the sensor, the velocity sensor comprising:

first means for determining velocity data from a velocity dependent frequency derived from a variable magnitude signal reflected from the object and from a predetermined fixed frequency, the first means operating without mixing the variable magnitude signal with the fixed frequency; and second means for limiting the effect of reflected signal degradation upon derivation of the velocity data, the variable magnitude reflected signal being received by an input of the second means and the second means having an output coupled to an input of the first means;

the first means comprising first and second counters, the first counter receiving the velocity dependent frequency and establishing a variable length time period corresponding to a predetermined number of cycles of the velocity dependent frequency, the second counter receiving the fixed frequency and counting at said fixed frequency for said established time period, the contents of said second counter at the end of said time period being indicative of the object velocity; and the second means comprising a drop-out circuit for inhibiting the first and second counters when a magnitude of the reflected signal drops below a predetermined threshold.

12. The velocity sensor of claim 11, further comprising:

a flip-flop with a clock input coupled to receive the velocity dependent frequency, a set input, and a Q output, the second counter having an inhibit input coupled to the Q output of the flip-flop and a clock input coupled to receive the fixed frequency; and the first counter having an inhibit input coupled to the Q output of the flip-flop, a clock input coupled to receive the velocity dependent frequency and a 0-out terminal coupled to the set input of the flip-flop, the 0-out terminal changing state at the end of said time period so that in response, the flip-flop Q output and the inhibit inputs change from a first state to a second state, thereby preventing further counting of the first and second counters.

13. The velocity sensor of claim 12, further comprising:

a first monostable multivibrator having an input coupled to the 0-out terminal of the first counter and having an output; and a second monostable multivibrator having an input coupled to the output of the first monostable multivibrator and having an output, the first and second counters each having a preset input coupled to the output of the second monostable multivibrator, the state change of the 0-out of the first counter causing the first monostable multivibrator to fire, which, in turn, causes the second monostable multivibrator to fire, the firing of the second monostable multivibrator causing the first and second counters to be reset to first and second initial values, respectively.

14. The velocity sensor of claim 13, further comprising:

a latch with data inputs coupled to receive the contents of the second counter and with a read input coupled to the output of the first monostable multivibrator so that firing of the first monostable multivibrator causes the latch to read and store therein the contents of the second counter.

15. The velocity sensor of claim 14, wherein:

the second monostable multivibrator is triggered to begin firing at the end of the firing period of the first monostable multivibrator so that the latch reads the second counter contents before the second counter is reset.

16. The velocity sensor of claim 13, further comprising:

an OR gate with a first input coupled to the output of the second monostable multivibrator, with an output coupled to the preset inputs of the first and second counters, and with a second input;

a resistor coupled between ground and the second OR gate input;

a switched terminal which is energized when system power is turned on; and a capacitor coupled between the second input of the OR gate and said switched terminal so that when the switched terminal is energized, a momentary signal is transmitted through the capacitor and OR gate to the preset inputs to thereby reset the first and second counters to their initial values upon system power turn-on.

17. The velocity sensor of claim 12, wherein the drop-out circuit comprises:

a sensing circuit for generating a drop-out signal when a magnitude of the reflected signal drops below the threshold.

18. The velocity sensor of claim 17, wherein:

the flip-flop has a data input coupled to receive the drop-out signal so that on the next cycle of the velocity dependent frequency, the drop-out signal forces the Q output of the flip-flop to the second state, thereby inhibiting both counters.

19. A radar or sonic velocity sensor for sensing the velocity of an object moving relative to the sensor, the velocity sensor comprising:

first means for determining velocity data from a velocity dependent frequency derived from a variable magnitude signal reflected from the object and from a predetermined fixed frequency, the first means operating without mixing the variable magnitude signal with the fixed frequency; and second means for limiting the effect of reflected signal degradation upon derivation of the velocity data, the variable magnitude reflected signal being received by an input of the second means and the second means having an output coupled to an input of the first means;

the first means comprising period measuring means for measuring the period of a predetermined number of cycles of said velocity dependent frequency, the period measuring means comprising a first counter counting said predetermined number of cycles at a rate equal to the velocity dependent frequency, and a second counter counting at a constant rate for said period; and the second means including means for preventing the measured period from being influenced when the reflected signal has a magnitude which falls below a threshold.

20. The velocity sensor of claim 19, further comprising:

memory means for storing the contents of the second counter, the velocity sensor operating so that the second counter contents are stored in the memory means at the end of every measured period.

21. The velocity sensor of claim 19, wherein the means for preventing comprises:

means for comparing a magnitude of the reflected signal to the threshold and for generating a drop-out signal when the magnitude falls below the threshold.

22. The velocity sensor of claim 21, wherein the means for preventing further comprises:

a bistable circuit having a clock input coupled to receive the reflected signal, having a data input coupled to receive the drop-out signal and having an output coupled to inhibit inputs of both the first and second counters, generation of a drop-out signal forcing the bistable output to a known state which prevents the first and second counters from counting.

23. The velocity sensor of claim 22, wherein:

the first counter has an output which changes state at the end of said period, the bistable circuit also having a set input coupled to the first counter output so that the bistable output changes to said known state at the end of said period.

24. The velocity sensor of claim 23, wherein:

the first and second counters each have preset inputs which cause the first and second counters to be initialized to predetermined first and second numbers, respectively, when a preset signal is applied thereto.

25. The velocity sensor of claim 24, further comprising:

a first monostable multivibrator having an input coupled to the first counter output and having an output; and a second monostable multivibrator having an input coupled to the output of the first monostable multivibrator and having an output coupled to the preset inputs of the first and second counters.

26. The velocity sensor of claim 25, further comprising:
a latch for receiving and storing the contents of the second counter, the latch having a read input coupled to the output of the first monostable multivibrator.

* * * * *